US 6,581,866 B2

(12) United States Patent
Tsuyuki et al.

(10) Patent No.: US 6,581,866 B2
(45) Date of Patent: Jun. 24, 2003

(54) MAGNETIC TAPE CARTRIDGE

(75) Inventors: Seiji Tsuyuki, Kanagawa-ken (JP); Hideaki Shiga, Kanagawa-ken (JP); Daisuke Takahashi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/146,907

(22) Filed: May 17, 2002

(65) Prior Publication Data

US 2002/0171978 A1 Nov. 21, 2002

(30) Foreign Application Priority Data

May 18, 2001 (JP) ........................................ 2001-148601

(51) Int. Cl.[7] ............................................. G11B 23/107
(52) U.S. Cl. ....................................... 242/348; 360/132
(58) Field of Search ................................ 242/348, 343, 242/338.1; 360/132

(56) References Cited

U.S. PATENT DOCUMENTS

| 4,512,535 A | * | 4/1985 | Dickson et al. | ............. | 242/343 |
| 6,318,657 B1 | * | 11/2001 | Nayak | ................. | 242/338.1 |
| 6,462,905 B1 | * | 10/2002 | Takahashi et al. | .......... | 360/132 |
| 6,499,686 B2 | * | 12/2002 | Tsuyuki et al. | ............. | 242/348 |

FOREIGN PATENT DOCUMENTS

| EP | 1 098 320 | * | 5/2001 |
| EP | 1 098 321 | * | 5/2001 |
| JP | 11-238351 | * | 8/1999 |
| JP | 11-238352 | * | 8/1999 |
| JP | 11-238358 | | 8/1999 |
| JP | 11-250618 | * | 9/1999 |
| JP | 11-306725 | * | 11/1999 |
| JP | 2000-48525 | * | 2/2000 |

* cited by examiner

*Primary Examiner*—William A. Rivera
(74) *Attorney, Agent, or Firm*—Sughrue Mion, PLLC

(57) ABSTRACT

A magnetic tape cartridge is equipped with a cartridge case in which a single reel with magnetic tape wound on the outer periphery of a reel hub is rotatably housed. The cartridge is further equipped with a locking member, and a plurality of ribs extending in the axial direction and formed in the inner periphery of the reel hub. The locking member is provided within the reel hub so that it is movable between a locking position and an unlocking position in the axial direction of the reel. The locking member locks the reel to restrain rotation of the reel when not being used. A first radial clearance between the locking member and the ribs at the locking position is set to a value smaller than a second radial clearance between the locking member and the ribs at the unlocking position.

5 Claims, 6 Drawing Sheets

MAGNETIC TAPE CARTRIDGE

BACKGROUND OF THE INVENTION

1. Field of the Invention

The present invention relates to a magnetic tape cartridge, and more particularly to a magnetic tape cartridge in which a single reel with magnetic tape wound thereon is rotatably housed within a cartridge case, and in which a reel locking mechanism, for causing the reel to be in a locked state when not being used, is provided within a reel hub.

2. Description of the Related Art

In the existing magnetic tape cartridges, which are being used as storage media that are employed in external storage units for computers, etc., there is known a type where a single reel with magnetic tape wound thereon is rotatably housed within a cartridge case. This type of magnetic tape cartridge has only a single reel within the cartridge case. Because of this, when the magnetic tape is loosened by shock due to a fall of the cartridge, etc., the loose part cannot be absorbed and therefore there is a disadvantage that the magnetic tape will be damaged.

Hence, there has been proposed a magnetic tape cartridge equipped with a reel locking mechanism for restraining rotation of the reel when not being used. The reel locking mechanism is disclosed, for example, in Japanese Unexamined Patent Publication No. 11(1999)-238352. The reel locking mechanism is equipped with a locking member movable in the axial direction of the reel between a locking position and an unlocking position; a member for urging the locking member in a locking direction; and an unlocking member for moving the locking member to the unlocking position by being rotated integrally with the reel by the rotation-drive member of a cartridge drive unit.

The locking member is equipped with locking teeth, which mesh with locking teeth formed in the reel to forcibly lock rotation of the reel when not being used. That is, the locking member is constructed so that the magnetic tape is not tightened or loosened by shock due to a fall of the cartridge, etc.

This type of magnetic tape cartridge, incidentally, is often loaded into a cartridge drive unit so that the reel is horizontally held. However, in the case of an automatic loader with a large number of cartridges, for example, each cartridge is loaded into the cartridge drive unit so that the reel is vertically held. That is, each cartridge is vertically placed.

In that case, the cartridge case is positioned by the positioning means of the cartridge drive unit, and in order to prevent the outer periphery of the reel from contacting the inner wall surface of the cartridge case, there is a radial clearance of some magnitude between the inner wall surface of the cartridge case and the outer periphery of the reel. Therefore, if the cartridge is vertically placed, the reel will be moved downward by the amount of the radial clearance. Because of this, the center axis of the reel hub is shifted from that of the rotation-drive member of the cartridge drive unit, and consequently, there is a problem that the chucking operation of the rotation-drive member with respect to the reel hub cannot be performed.

SUMMARY OF THE INVENTION

The present invention has been made in view of the circumstances mentioned above. Accordingly, it is the primary object of the present invention to provide a magnetic tape cartridge which is capable of preventing chucking failure when it is vertically loaded into a cartridge drive unit.

To achieve this end and in accordance with the present invention, there is provided a magnetic tape cartridge comprising:

a cartridge case in which a single reel with magnetic tape wound on the outer periphery of a reel hub is rotatably housed;

a locking member, provided within the reel hub so that it is movable between a locking position and an unlocking position in an axial direction of the reel, for locking the reel to restrain rotation of the reel when not being used; and a plurality of ribs extending in the axial direction and formed in the inner periphery of the reel hub;

wherein a first radial clearance between the locking member and the ribs at the locking position is set to a value smaller than a second radial clearance between the locking member and the ribs at the unlocking position.

In the magnetic tape cartridge of the present invention, each of the ribs may be provided with a stepped portion so that the height of the rib from the inner periphery of the reel hub becomes higher at the locking position than at the unlocking position. In addition, each rib may have an inclined surface so that the height of the rib from the inner periphery of the reel hub becomes higher at the locking position than at the unlocking position.

In the magnetic tape cartridge of the present invention, it is preferable that the locking member be provided with a protruding portion, which is opposed in close proximity to the inner peripheral surface of a flange of the reel at the locking position, for regulating core axis misalignment of the reel. It is also preferable that the protruding portion be provided at a position away from the outer peripheral portion of the locking member in the direction of the axis of the reel. For instance, a circumferential wall may be provided so that it extends in the unlocking direction from the outer peripheral portion of the locking member facing the aforementioned ribs and has a protruding portion at its upper end. In this case, when the aforementioned locking member is at the unlocking position, the protruding portion of the circumferential wall is not opposed to the ribs.

According to the present invention, the first radial clearance between the locking member and the ribs at the locking position is set to a value smaller than the second radial clearance between the locking member and the ribs at the unlocking position. Therefore, even if the reel is caused to move downward by the weight of the magnetic tape when the magnetic tape cartridge is vertically loaded into a cartridge drive unit, the ribs abut the outer peripheral surface of the locking member immediately and regulate the downward movement of the reel. As a result, the amount of the core axis misalignment of the reel hub with respect to the rotation-drive member of the cartridge drive unit is held down to a slight value. Thus, chucking failure due to the core axis misalignment is prevented.

In addition, the second radial clearance between the locking member and the ribs at the unlocking position is set to a relatively great value. Therefore, there is no possibility that during rotation of the reel, the ribs will make contact with the locking member.

According to the present invention, the locking member is provided with a protruding portion, which is opposed in close proximity to the inner peripheral surface of the flange of the reel at the locking position through slight clearance. In this case, the core axis misalignment of the reel with respect to the rotation-drive member of the cartridge drive unit can be regulated at two positions away from the direction of the axis of the reel, so that the effect of preventing core axis misalignment can be further enhanced.

BRIEF DESCRIPTION OF THE DRAWINGS

The present invention will be described in further detail with reference to the accompanying drawings wherein.

DESCRIPTION OF THE PREFERRED EMBODIMENTS

Preferred embodiments of the present invention will hereinafter be described in detail with reference to the drawings.

Figure 1:
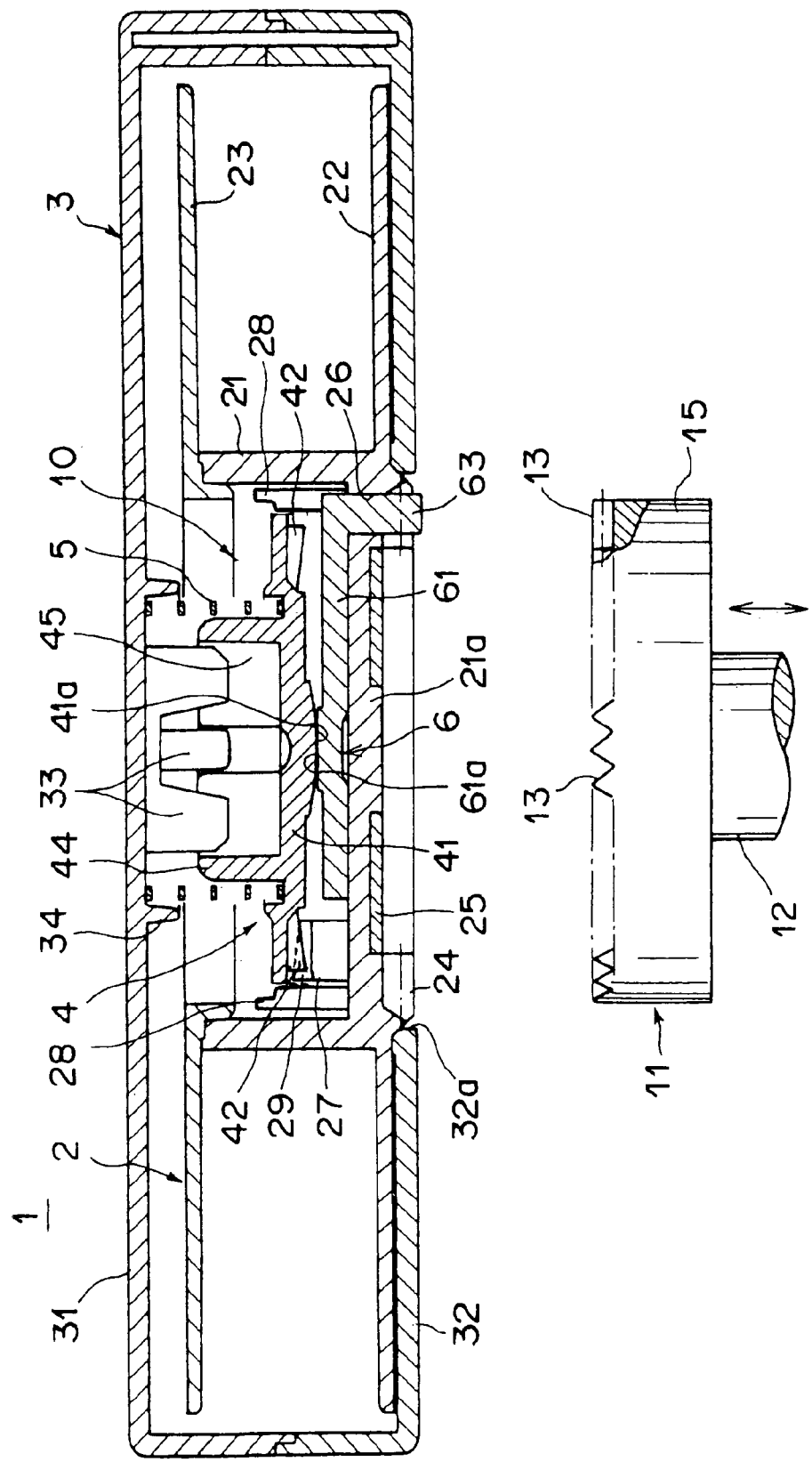
FIG. 1 is a sectional view showing a magnetic tape cartridge constructed according to a first embodiment of the present invention, the cartridge being in its non-operative state.

In FIG. 1, a magnetic tape cartridge 1 has a cartridge case 3, which consists of an upper case 31 and a lower case 32. The upper case 31 and the lower case 32 are fastened together with small screws, etc. The lower case 32 has an opening 32a at the center portion. Within the cartridge case 3, a single reel 2 with magnetic tape (not shown) wound thereon is rotatably housed. Furthermore, within the center bore of the reel 2, a reel locking mechanism 10 is housed. The reel locking mechanism 10 locks the reel 2 to restrain rotation of the reel 2 when the magnetic tape cartridge 1 is not used.

The reel 2 consists of a bottomed cylindrical reel hub 21, a lower flange 22, and an upper flange 23. Magnetic tape is wound on the outer periphery of the reel hub 21, and the upper and lower flanges 22 and 23 are respectively projected in discoid form in the radial direction from the upper and lower ends of the outer periphery of the reel hub 21. The reel hub 21 and the lower flange 22 are integrally formed from synthetic resin. The upper flange 23 is likewise formed form synthetic resin, and is fixedly attached to the upper end of the reel hub 21 by ultrasonic welding, for example.

The reel hub 21 has a bottom wall 21a, and the radially outer portion of the bottom surface of the bottom wall 21a is provided with an annular reel gear 24 which meshes with the driving gear 13 of the rotation-drive member 11 of a cartridge drive unit (not shown). On the radially inner side from the reel gear 24, a reel plate 25 for magnetic suction is mounted in the bottom surface of the bottom wall 21a by insert molding. The reel plate 25 is constructed of an annular metal plate. The reel gear 24 and reel plate 25 of the reel 2 are disposed to face the opening 32a formed in the bottom surface of the cartridge case 3. Note that the reel 2 is urged downward by the urging member (e.g., a coil spring) 5 of a reel locking mechanism 10 to be described later, whereby the lower flange 22 is pressed against the lower case 32.

The rotation-drive member 11 of the cartridge drive unit, on the other hand, is equipped with the aforementioned annular driving gear 13 and a driving magnet (not shown), which are provided on the top surface of a disc portion 15 mounted on the top of a rotatable shaft 12.

In the chucking operation of the rotation-drive member 11, the magnetic tape cartridge 1 loaded into a bucket (not shown) on the side of the cartridge drive unit is first lowered toward the rotatable shaft 12. Then, the driving gear 13 meshes with the reel gear 24, and the reel plate 25 inside the reel gear 24 is attracted by the driving magnet provided inside the driving gear 13, whereby the meshed state between the driving gear 13 and the reel gear 24 is held.

Next, the reel locking mechanism 10 will be described in detail with reference to FIGS. 5A and 5B. Note in the figures that the urging member (coil spring) 5 is omitted.

This reel locking mechanism 10 is equipped with a locking member 4 axially movable between a locking position and an unlocking position; an urging member (coil spring) 5 for urging the locking member 4 in a locking direction; and an unlocking member 6 for moving the locking member 4 in an unlocking direction.

Figure 3:
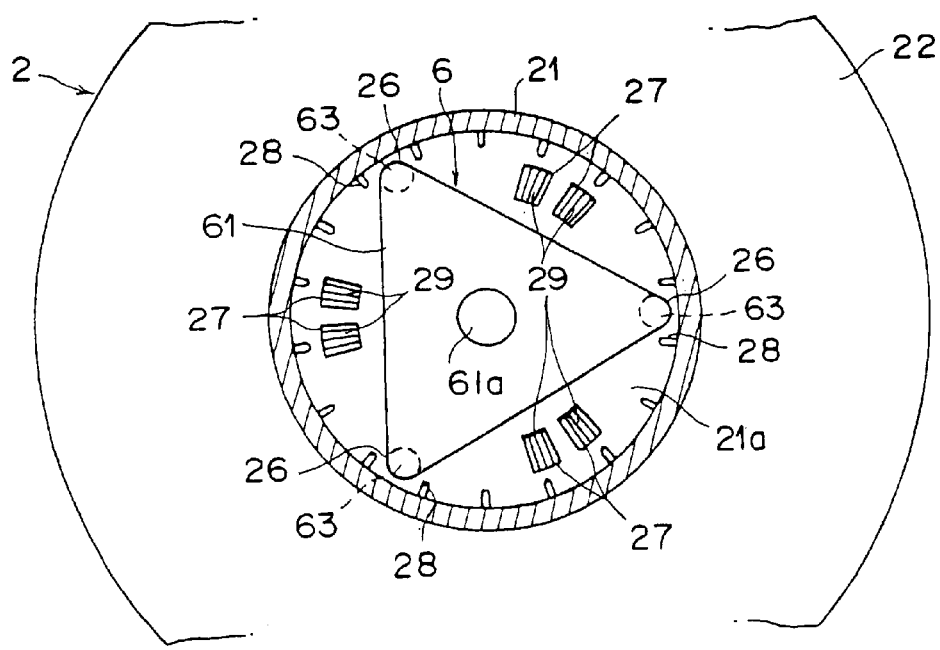
FIG. 3 is a sectional plan view taken substantially along line III—III of FIG. 2.

In the bottom wall 21a of the reel 2, 3 (three) through bores 26 vertically penetrating the reel gear 24 are disposed on the same circle at regular intervals (see FIG. 3). Furthermore, in the top surface of the bottom wall 21a, three pairs of stopper protrusions (i.e., 6 (six) stopper protrusions) 27 are arranged at regular intervals on the same circle at the positions between the through bores 26. The tip of each stopper protrusion 27 is provided with locking teeth 29. Note that three or more through bores 26 may be arranged. Also, three or more pairs of stopper protrusions 27 may be arranged. Furthermore, the tip of the stopper protrusion 27 may be provided with a single gear tooth instead of the locking teeth 29.

The locking member 4, formed from synthetic resin, has a disc portion 41 within the reel hub 21 of the reel 2, the disc portion 41 being disposed to face the bottom wall 21a of the reel 2. The radially outer portion of the bottom surface of the disc portion 41 is formed into annular locking teeth 42, which are meshable with the locking teeth 29 of the stopper protrusions 27. In addition, the center portion of the bottom surface of the disc portion 41 is projected downward and formed into a slide portion 41a. The slide portion 41a is engageable with the slide portion 61a of the top surface of the main body portion 61 of the unlocking member 6 to be described later by the urging force of the urging member 5.

The locking teeth 42 of the locking member 4 and the locking teeth 29 of the reel 2 are each formed into the shape of a cone so that the tooth depth becomes higher at the radially outer portion than at the radially inner portion. That is, the radially outer portions first mesh each other.

A protruding portion 44 extends upward from the top surface of the disc portion 41 of the locking member 4. The protruding portion 44 is provided with a stopper groove 45 in the form of a cross, which extends vertically (see FIG. 4). On the other hand, a supporting portion (swivel stopping protrusion) 33 that is inserted into the stopper groove 45 is erected in the inside surface of the upper case 31 of the cartridge case 3. If the stopper groove 45 and the supporting portion 33 engage with each other, the locking member 4 can move in an up-and-down direction without being rotated. The clearance between the stopper groove 45 of the locking member 4 and the supporting portion 33 of the upper case 31 is set extremely small.

The aforementioned urging member 5, consisting of a coil spring, is compressed and interposed between the top surface, outside the protruding portion 44, of the disc portion 41 of the locking member 4, and the spring receiver 34, outside the supporting portion 33, of the upper case 3. With the urging member 5 thus interposed, the locking member 4 is urged downward in the direction where the locking teeth 42 of the locking member 4 engage with the locking teeth 29 of the reel 2.

The unlocking member 6 is interposed between the locking member 4 and the bottom wall 21a of the reel hub 21 so that it is movable up and down. For this reason, three cylindrical leg portions 63 extending downward are provided on the bottom surface of a main body portion 61 in the form of a generally triangular plate that corresponds to the vertices of the main body portion 61. The leg portions 63 are inserted into the through bores 26 formed in the bottom wall 21 of the reel 2 so that they are movable. The lower ends of the leg portions 63 are located to face the tooth portion of the reel gear 24 of the bottom surface of the reel 2. With the leg portions 63 inserted into the through bores 26, each pair of stopper protrusions 27 is located between two adjacent leg portions 63 and outside the main body portion 61 of the unlocking member 6. Note that the leg portion 63 may be formed into the shape of a square pillar, an elliptical cylinder, etc.

When the unlocking member 6 is at the lowermost position (see FIGS. 1 and 5A), the lower ends of the leg portions 63 of the unlocking member 6 project from the bottom surface of the reel gear 24. As the driving gear 13 is meshed with the reel gear 24 by the chucking operation of the rotation-drive member 11 of the cartridge drive unit (not shown), the unlocking member 6 is pushed upward by a predetermined quantity of stroke (see FIGS. 2 and 5B). At the same time, the reel 2 is slightly pushed upward by the driving gear 13 and is separated from the lower case 32. The unlocking member 6 is rotated integrally with the reel 2 by the fit of the leg portions 63 into the through bores 26.

Figure 4:
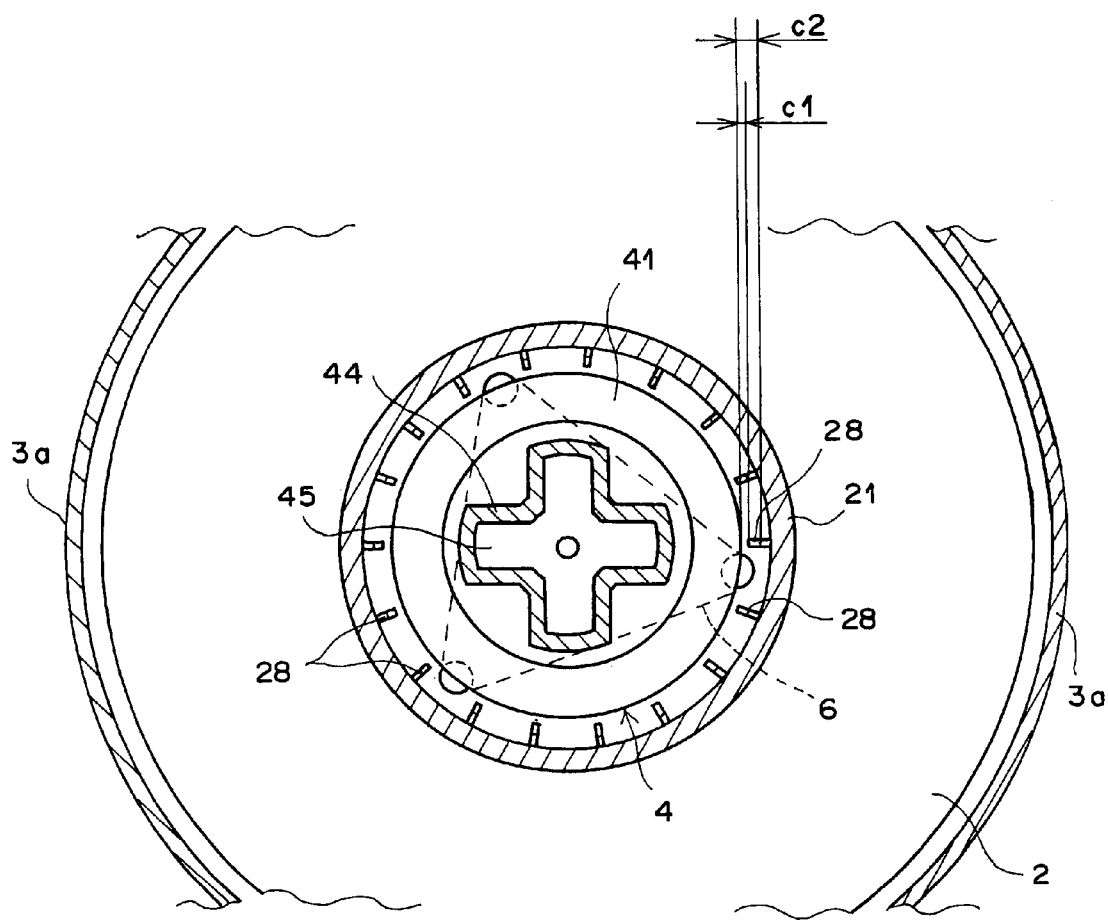
FIG. 4 is an enlarged sectional view taken substantially along line IV—IV of FIG. 2.

The reel 2 has a large number of ribs 28 extending in the axial direction of the reel 2 at the inner peripheral surface thereof, the ribs 28 being formed at predetermined intervals in the circumferential direction of the reel 2. Some of the ribs 28 function as guide ribs that guide the unlocking member 6 in the direction of insertion when inserting the leg portions 63 of the unlocking member 6 into the through bores 26. The remaining ribs function as reinforcement ribs for the reel hub 21 (see FIGS. 3 and 4). As clearly shown in FIG. 4, the outer ends of the ribs 28 are on a circle concentric with the reel hub 21 and are opposed to the outer peripheral surface of the disc portion 41 of the locking member 4. In FIG. 4, reference numeral 3a denotes a circular arc rib 3a formed in the cartridge case 3.

Figure 5A:
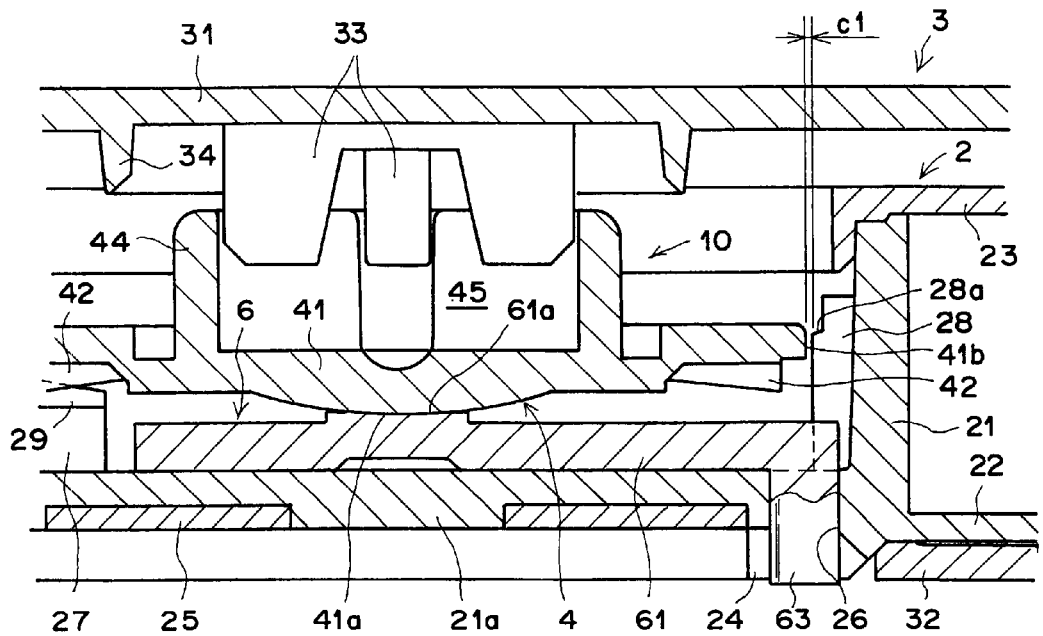
FIG. 5A is an enlarged sectional view showing the essential part of the magnetic tape cartridge of FIG. 1.
Figure 5B:
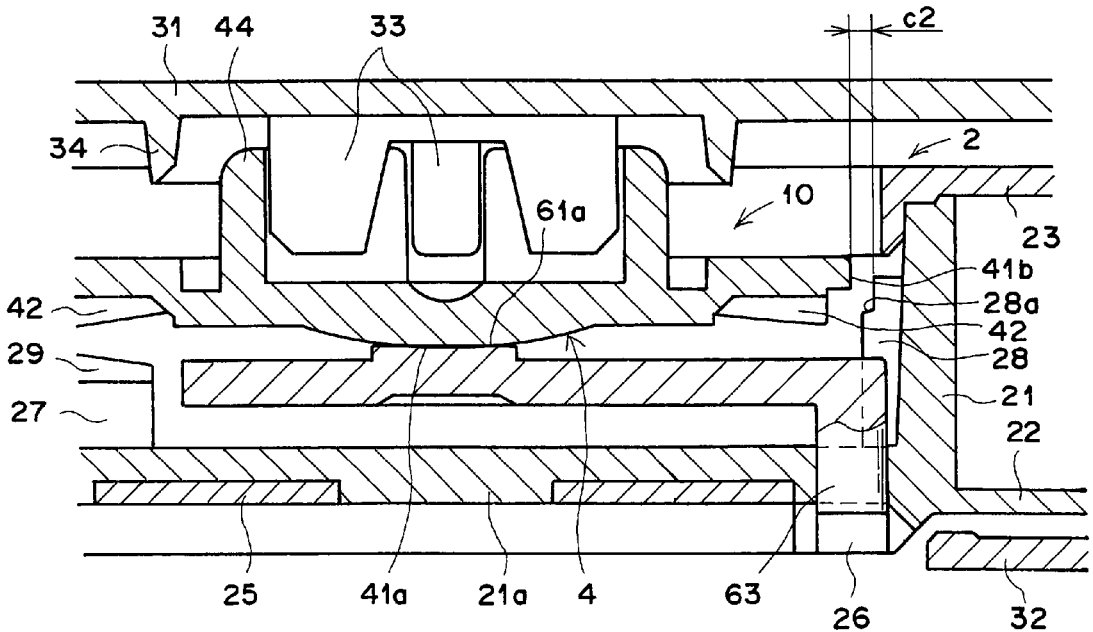
FIG. 5B is an enlarged sectional view showing the essential part of the magnetic tape cartridge of FIG. 2.

As clearly shown in FIGS. 5A and 5B, the upper end portion of a vertical rib 28 is provided with a stepped portion 28a so that the height of the lower portion from the reel inner peripheral surface becomes higher than that of the upper portion.

Next, operation of the reel locking mechanism 10 will be described. In the non-operative state, such as an archived state, etc., of the magnetic tape cartridge 1 shown in FIGS. 1 and 5A, the locking member 4, the unlocking member 6, and the reel 2 have been moved to the side of the lower case 32 of the cartridge case 3 by the urging force of the urging member 5. The center opening 32a in the lower case 32 is closed by the reel 2. The unlocking member 6 is at the lower most position where the bottom surface thereof abuts the top surface of the bottom wall 21a of the reel hub 21. The lower ends of the leg portions 63 of the unlocking member 6 project from the tooth edge of the reel gear 24. Similarly, the locking member 4 abutting the top surface of the unlocking member 6 is at a lowered position. The locking teeth 42 of the locking member 4 mesh with the locking teeth 29 of the stopper protrusions 27. Thus, the locking member 4 is in a locked state of restraining rotation of the reel 2 and preventing magnetic tape from being pulled out of the magnetic tape cartridge 1.

In the locked state, as clearly shown in FIG. 5A, the outer peripheral surface 41b of the disc portion 41 of the locking member 4 at the locking position is opposed to the lower portion, under the stepped portion 28a, of the rib 28 of the reel 2. With this arrangement, the clearance c1 between the outer peripheral surface 41b of the disc portion 41 of the locking member 4 and the rib 28 becomes a small value, and consequently, the core axis misalignment of the reel 2 with respect to the rotation-drive member 11 of the cartridge drive unit can be prevented.

Figure 2:
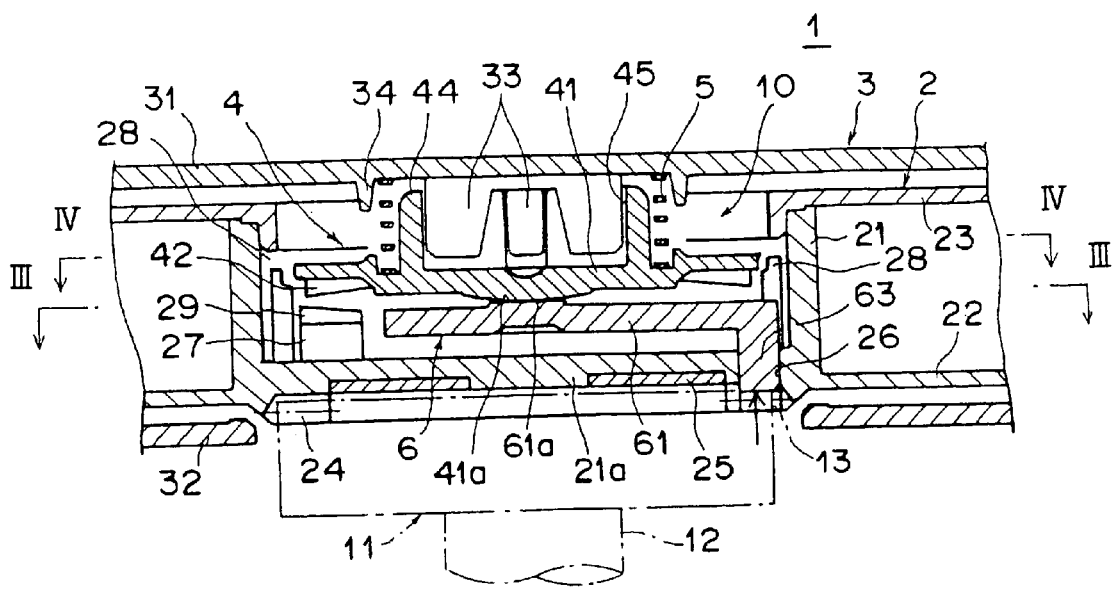
FIG. 2 is a fragmentary sectional view showing the state in which the magnetic tape cartridge of FIG. 1 is in its operative state.

On the other hand, in the operative state of FIGS. 2 and 5B in which the magnetic tape cartridge 1 is loaded into the cartridge drive unit, the disc portion 15 of the rotational shaft 12 of the rotation-drive member 11 is moved toward the bottom surface of the reel 2. The driving gear 13 meshes with the reel gear 24 and moves and holds the reel 2 slightly upward. Then, the tooth edges of the driving gear 13 abut the lower ends of the leg portions 63 of the unlocking member 6 and push them up. As a result, the unlocking member 6 moves upward against the urging force of the urging member 5, and the locking member 4, along with this unlocking member 6, also moves upward in the unlocking direction. This unlocks the engagement between the locking teeth 42 and the locking teeth 29, whereby the reel 2 becomes free to rotate. In this manner, the magnetic tape is loaded or unloaded by the cartridge drive unit.

In the unlocked state, as clearly shown in FIG. 5B, the outer peripheral surface 41b of the disc portion 41 of the locking member 4 is opposed to the upper portion, above the stepped portion 28a, of the rib 28 of the reel 2. With this arrangement, the clearance c2 between the outer peripheral surface 41b of the disc portion 41 of the locking member 4 and the rib 28 becomes a small value greater than the clearance c1. Therefore, even if there is slight core axis misalignment in the reel 2 being rotated, there is no possibility that the rib 28 will make contact with the outer peripheral surface 41a of the disc portion 41 of the locking member 4.

Figure 6A:
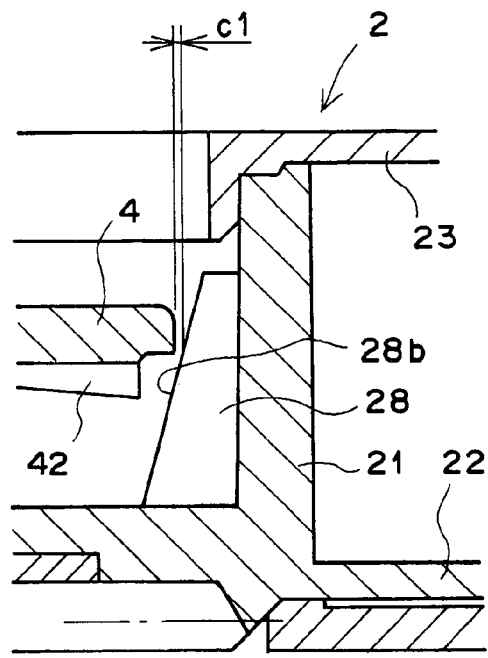
FIGS. 6A and 6B are sectional views showing a modification of the rib shown in FIGS. 5A and 5B.
Figure 6B:
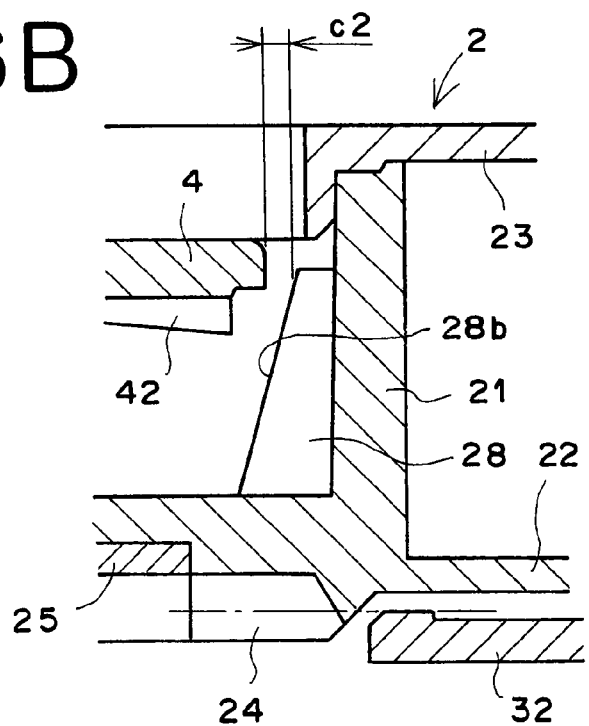

For the shape of the upper portion of the rib 28, the stepped portion 28a may be inclined. In this case, the locking member 4 can be easily inserted. As shown FIGS. 6A and 6B, the rib 28 may have an inclined surface 28b instead of the stepped portion 28a. In the case of the inclined surface 28b, the height of the rib 28 from the inner periphery of the reel 2 is higher at its lower portion than at its upper portion. As with the case of the stepped portion 28a, a relationship of c1<c2 can be held. In this case, the locking member 4 can be more easily inserted.

In the first embodiment, as evident in the foregoing description, the radial clearance c1 between the locking member 4 and the ribs 28 in the locked state is set to a value smaller than the radial clearance c2 between the locking member 4 and the ribs 28 in the unlocked state. Therefore, even if the reel 2 is caused to move downward by the weight of the magnetic tape when the magnetic tape cartridge 1 is vertically loaded into the cartridge drive unit, the outer ends of the ribs 28 abut the outer peripheral surface of the disc portion 41 of the locking member 4 immediately and regulate the downward movement of the reel 2. As a result, the amount of the core axis misalignment of the reel hub 21 with respect to the rotation-drive member 11 of the cartridge drive unit is held down to a slight value. Thus, chucking failure due to the core axis misalignment is prevented.

In addition, the radial clearance c2 between the locking member 4 and the ribs 28 in the unlocked state is set to a relatively great value. Therefore, there is no possibility that during rotation of the reel 2, the rib 28 will make contact with the outer peripheral surface 41b of the locking member 4.

Figure 7A:
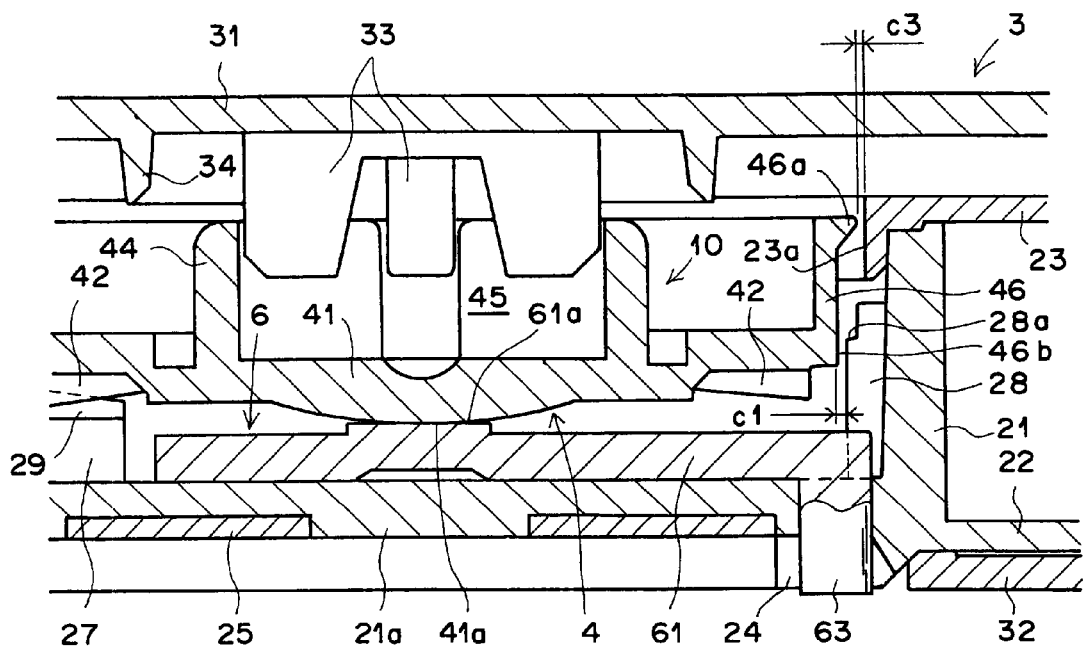
FIGS. 7A and 7B are sectional views showing a magnetic tape cartridge constructed according to a second embodiment of the present invention.
Figure 7B:
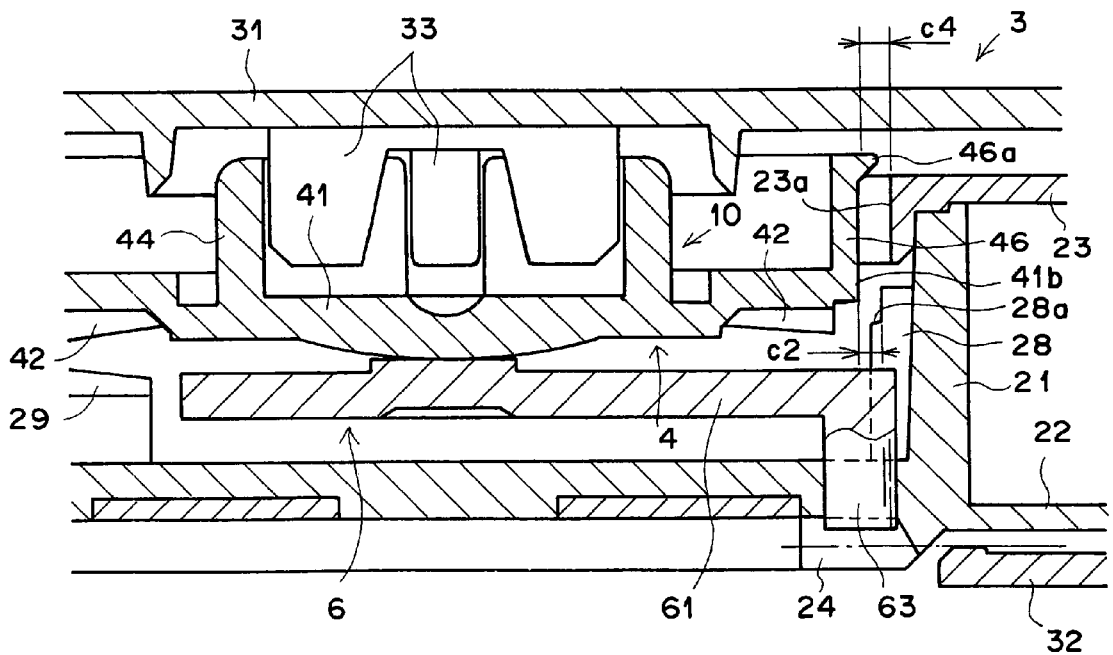

FIGS. 7A and 7B show a magnetic tape cartridge according to a second embodiment of the present invention, and correspond to FIGS. 5A and 5B, respectively. In FIGS. 7A and 7B, the same reference numerals are applied to the same parts as those of FIGS. 5A and 5B to avoid redundancy.

In the second embodiment, in addition to the construction shown in FIGS. 5A and 5B, a locking member 4 is formed integrally with a circumferential wall 46. The circumferential wall 46 extends vertically from the radially outer portion of the disc portion 41 facing the aforementioned ribs 28 and has an annular protrusion 46a at its upper end. The annular protrusion 46a extends toward the inner peripheral surface 23a of an upper flange 23.

As mentioned previously, the upper flange 23 of a reel 2 is fixedly attached to the upper end of a reel hub 21 by ultrasonic welding, for example. As clearly shown in FIGS. 7A and 7B, the inner peripheral surface 23a of the upper flange 23 overhangs inwardly from the inner peripheral surface of the reel hub 21. The overhanging surface 23a from the inner peripheral surface of the reel hub 21 is lower than the rib 28. In the locked state, as shown in FIG. 7A, the circumferential protrusion 46a of the locking member 4 is opposed in close proximity to the inner peripheral surface 23a of the upper flange 23 through slight clearance c3 and regulates the core axis misalignment of the reel 2 with respect to the rotation-drive member 11 of the cartridge drive unit.

In the unlocked state, as shown in FIG. 7B, the circumferential protrusion 46a of the locking member 4 is located above the top surface of the upper flange 23 of the reel 2, so that the outer peripheral surface of the circumferential wall 46 of the locking member 4 is opposed to the inner peripheral surface 23a of the upper flange 23. Therefore, the clearance c4 between the outer peripheral surface of the circumferential wall 46 and the inner peripheral surface 23a of the upper flange 23 becomes a value greater than the clearance c3 in the locked state. Thus, even if there is slight core axis misalignment in the reel 2 being rotated, there is no possibility that the inner peripheral surface 23a of the upper flange 23 will make contact with the outer peripheral surface of the circumferential wall 46 of the locking member 4.

Thus, in the second embodiment, the core axis misalignment of the reel 2 with respect to the rotation-drive member 11 of the cartridge drive unit can be regulated at two positions away from the direction of the axis of the reel 2, so that the effect of preventing core axis misalignment can be further enhanced.

While the present invention has been described with reference to the preferred embodiments thereof, the invention is not to be limited to the details given herein, but may be modified within the scope of the invention hereinafter claimed.

What is claimed is:

1. A magnetic tape cartridge comprising:
    a cartridge case in which a single reel with magnetic tape wound on an outer periphery of a reel hub is rotatably housed;
    a locking member, provided within said reel hub so that it is movable between a locking position and an unlocking position in an axial direction of said reel, for locking said reel to restrain rotation of said reel when not being used; and
    a plurality of ribs extending in said axial direction and formed in an inner periphery of said reel hub;
    wherein a first radial clearance between said locking member and said ribs at said locking position is set to a value smaller than a second radial clearance between said locking member and said ribs at said unlocking position.

2. The magnetic tape cartridge as set forth in claim 1, wherein each of said ribs is provided with a stepped portion so that the height of said rib from the inner periphery of said reel hub becomes higher at said locking position than at said unlocking position.

3. The magnetic tape cartridge as set forth in claim 1, wherein each of said ribs has an inclined surface so that the height of said rib from the inner periphery of said reel hub becomes higher at said locking position than at said unlocking position.

4. The magnetic tape cartridge as set forth in claim 1, wherein said locking member is provided with a protruding portion, which is opposed in close proximity to an inner peripheral surface of a flange of said reel at said locking position, for regulating core axis misalignment of said reel.

5. The magnetic tape cartridge as set forth in claim 4, wherein a third radial clearance between said protruding portion and the inner peripheral surface of said flange at said locking position is narrower than a fourth radial clearance between said protruding portion and the inner peripheral surface of said flange at said unlocking position.

* * * * *